United States Patent
Kimura et al.

(10) Patent No.: US 6,343,137 B1
(45) Date of Patent: Jan. 29, 2002

(54) METHOD OF PROCESSING AN IMAGE SUCH AS A STILL IMAGE

(75) Inventors: Hiroyuki Kimura; Koji Takahashi, both of Yokohama; Kazunobu Urushihara, Inagi; Susumu Matsumura, Yokohama; Makoto Katsuma; Hiroshi Ohmura, both of Wako, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 1417 days.

(21) Appl. No.: 08/542,330

(22) Filed: Oct. 12, 1995

Related U.S. Application Data

(62) Division of application No. 08/321,019, filed on Oct. 6, 1994, now abandoned, which is a continuation of application No. 08/051,806, filed on Apr. 26, 1993, now abandoned, which is a continuation of application No. 07/653,745, filed on Feb. 11, 1991, now abandoned, which is a continuation of application No. 07/352,697, filed on May 10, 1989, now abandoned, which is a continuation of application No. 06/891,586, filed on Aug. 1, 1986, now abandoned.

(30) Foreign Application Priority Data

Aug. 5, 1985 (JP) .............................. 60-172011

(51) Int. Cl.[7] ................................................. G06K 9/00
(52) U.S. Cl. ....................................................... 382/100
(58) Field of Search ........................... 382/5, 100, 254; 352/48, 50–53, 140; 354/163, 225, 291, 400, 407, 421, 354, 154; 355/40, 68, 77, 83; 358/903, 909

(56) References Cited

U.S. PATENT DOCUMENTS

| | | | | |
|---|---|---|---|---|
| 2,353,257 A | * | 7/1944 | Mihalyi ........................ 354/163 |
| 3,006,993 A | * | 10/1961 | Barndt ......................... 358/183 |
| 3,490,844 A | | 1/1970 | Sapp, Jr. ....................... 355/40 |
| 3,772,465 A | * | 11/1973 | Vlahos .......................... 382/54 |
| 3,821,468 A | * | 6/1974 | Busch .......................... 358/183 |
| 3,883,242 A | * | 5/1975 | Takahashi et al. ........... 355/210 |
| 3,954,334 A | * | 5/1976 | Bestenreiner ................ 355/71 |
| 4,019,817 A | * | 4/1977 | Matsumoto ................... 355/88 |
| 4,045,136 A | * | 8/1977 | Watson ......................... 355/83 |
| 4,095,889 A | * | 6/1978 | Goren .......................... 354/270 |
| 4,160,596 A | * | 7/1979 | Joseph ......................... 355/83 |
| 4,168,120 A | * | 9/1979 | Freier et al. ................... 355/88 |
| 4,198,136 A | * | 4/1980 | Staudacher ................... 352/169 |
| 4,294,537 A | * | 10/1981 | Laska et al. ................... 355/40 |
| 4,325,621 A | * | 4/1982 | Iwata et al. ................... 354/286 |
| 4,334,245 A | * | 6/1982 | Michael ........................ 358/183 |
| 4,344,699 A | * | 8/1982 | McIntosh ...................... 355/83 |
| 4,351,609 A | * | 9/1982 | Inoue et al. ................... 355/50 |
| 4,392,156 A | * | 7/1983 | Duca ............................ 358/183 |
| 4,412,728 A | * | 11/1983 | Sakane et al. ................. 354/62 |
| 4,429,969 A | * | 2/1984 | Saegusa ....................... 354/414 |
| 4,514,073 A | * | 4/1985 | Taniguchi et al. ............ 354/431 |
| 4,529,283 A | * | 7/1985 | Oshima et al. ............... 354/121 |
| 4,557,577 A | * | 12/1985 | Shinoda ....................... 354/400 |
| 4,557,578 A | * | 12/1985 | Seely ............................ 354/400 |
| 4,558,945 A | * | 12/1985 | Andersen ...................... 355/68 |
| 4,560,863 A | * | 12/1985 | Matsumura et al. .......... 354/407 |
| 4,589,749 A | * | 5/1986 | Strobel ......................... 354/221 |

(List continued on next page.)

OTHER PUBLICATIONS

"The Joy of Photography", Eastman Kodak Co., Apr. 1981.*

*Primary Examiner*—Jose L. Couso
(74) *Attorney, Agent, or Firm*—Fitzpatrick, Cella, Harper & Scinto

(57) ABSTRACT

A method of processing an image comprises the steps of: supplying a photographing condition and/or a conversion process condition, e.g., at the time of photographing; using the supplied photographing condition and the supplied conversion process condition as parameters; and performing a processing, such as a conversion process, for an image signal of an image by using the parameters.

12 Claims, 8 Drawing Sheets

U.S. PATENT DOCUMENTS

| | | | |
|---|---|---|---|
| 4,606,625 A | * 8/1986 | Geshwind | 352/85 |
| 4,609,274 A | * 9/1986 | Iwashida et al. | 354/400 |
| 4,611,910 A | * 9/1986 | Suzuki et al. | 354/408 |
| 4,643,550 A | * 2/1987 | Kitagawa et al. | 354/79 |
| 4,644,401 A | * 2/1987 | Gaskins | 358/183 |
| 4,660,092 A | * 4/1987 | Nutting | 358/227 |
| 4,688,105 A | * 8/1987 | Block | 358/335 |
| 4,694,345 A | * 9/1987 | Rodgers | 358/216 |
| 4,748,509 A | * 5/1988 | Otake et al. | 354/400 |
| 4,752,831 A | * 6/1988 | Biber et al. | 354/400 |

* cited by examiner

FIG. 2  FIG. 3  FIG. 4
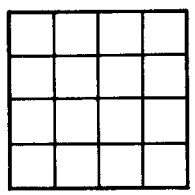 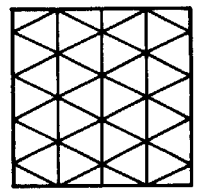 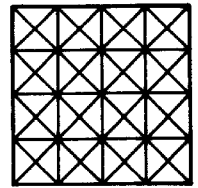
FIG. 5
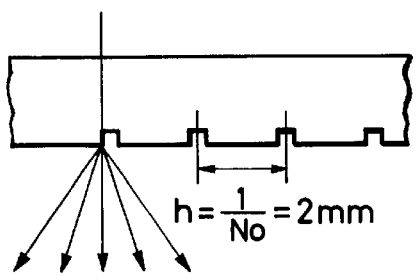
$h = \frac{1}{N_0} = 2mm$
FIG. 6
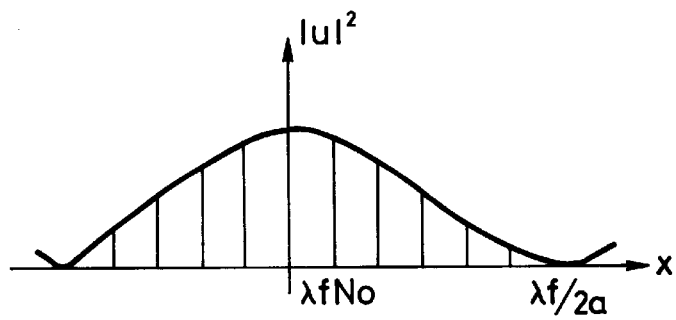
FIG. 7
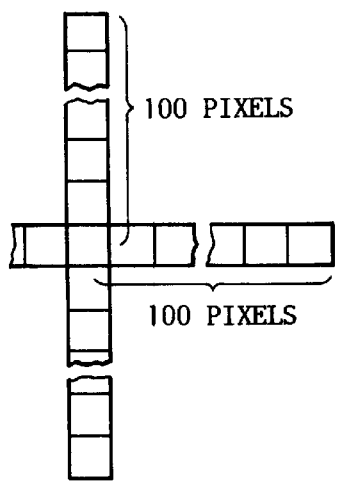

METHOD OF PROCESSING AN IMAGE SUCH AS A STILL IMAGE

This application is a division, of application Ser. No. 08/321,019 filed Oct. 6, 1994 now abandoned, which is a continuation of application Ser. No. 08/051,806 filed Apr. 26, 1993 now abandoned, which is a continuation of application Ser. No. 07/653,745 filed Feb. 11, 1991 now abandoned, which is a continuation of application Ser. No. 07/352,697, filed May 10, 1989 now abandoned, which is a continuation of application Ser. No. 06/891,586, filed Aug. 1, 1986 now abandoned.

BACKGROUND OF THE INVENTION

1. Field of the Invention

The present invention relates to a method of processing an image wherein a photographic image is subjected to a desired image conversion process.

2. Related Background Art

An image conversion process for image information signals will be described hereinbelow in connection with a so-called optical "cross screen filter" effect. With the "cross screen filter" effect, bright beams can be generated radially from a high luminance portion of an image.

Conventionally, an optical filter has been used as means for yielding such effect.

Optical filters commonly used in obtaining special effect photographs are those shown in Table 1.

TABLE 1

Type of Optical Filters

| Type | Name | Effect |
|---|---|---|
| Color | Purple | Hue of entire image is changed to purple |
| Zoomy Spot | Stream | Normal stream of image center and one-directional stream of image periphery |
|  | Radial | Radial stream as in zooming |
|  | Cyclone | Dynamic swirling stream |
|  | Aurora | Stream of aurora streamers emanating from one point of image periphery |
| Soft Foggy | Soften II (B) | Soft image effect with clear focusing point |
|  | Portrayer | Soft-tone flesh tint |
|  | Foggy | Whitish in aggregate as if photographed in fog |
|  | Mist Circle | Coloring image periphery with soft color tone |
| Cross Rainbow | Cross Screen | 4 bright beams from spot in image |
|  | Snow Cross | 6 bright beams from spot in image |
|  | Sunny Cross | 8 bright beams from spot in image |
|  | Rainbow Image 18X | 18 bright beams of rainbow color rings about spot in image |
| Mirage | Mirage 3F | One image is divided into 3 superposed images; multi-superposed effect |

As seen from Table 1, the snow cross and the sunny cross have a similar effect although they have a different number of radial bright beams, six and eight, respectively. The surface patterns of the cross screen, snow screen and sunny cross are shown in FIGS. 2 to 4. These patterns each have fine grooves engraved on the surface thereof. The grooves in a magnified scale are shown in FIG. 5 and the diffraction pattern is shown in FIG. 6. Bright beams emanate in the direction perpendicular to the groove, with the beam luminance being maximum at the center from which the beam starts and gradually lowering its luminance toward the periphery.

The "cross screen filter" effect can electrically be realized based on simulation of change in beam luminance. Particularly, a spatial filter matrix as shown in FIG. 7 is considered on an image screen plane constructed of 512×512 pixels, for example. A pixel having a high luminance is disposed at the center of the matrix. The matrix is then added with luminance data to obtain the luminance change in conformity with the function of FIG. 6. Thus, it is possible to electrically add the cross screen filter effect to a still image after it is photographed.

With the above method, it is possible to have the effect equivalent to that of various optical filters through an electrical process. However, the above method is associated with the following problems.

(1) Generally, the photographer and the operator performing the special effect processing are not the same person.

(2) The intent of the photographer is not reflected at the time (or in the procedure) of the special effect processing.

SUMMARY OR THE INVENTION

In view of the above problems, photographing conditions at the time of photographing and conversion process conditions assigned at the time of photographing are used as parameters for performing the conversion (special effect) process of the present invention, so that the intent of a photographer can be reflected in the special effect processing.

The other objects of the present invention will become apparent from the accompanying drawings and the following detailed description.

BRIEF DESCRIPTION OF THE DRAWINGS

FIGS. 2 to 4 show surface patterns of various optical filters;

FIG. 5 is an enlarged view showing the grooves of an optical filter;

FIG. 6 shows the diffraction distribution of an optical filter;

FIG. 7 shows a spatial filter for use in cross screen process;

DETAILED DESCRIPTION OF THE PREFERRED EMBODIMENTS

Input Conditions

The photographing conditions include photographing parameters (such as shutter speed, stop value, focal distance, use of flash lamp) and photographing environments (such as brightness, time, location).

The conversion process conditions include: the designation of a special effect process from among, e.g., cross screen process, sensitizing process, background light correction process, consecutive photographing and so on; and the selection of a cross screen process among those snow cross, sunny cross and ordinary cross. The conversion process conditions are divided into those designated at the time of photographing and those designated after photographing.

Outline of the System

Figure 1:
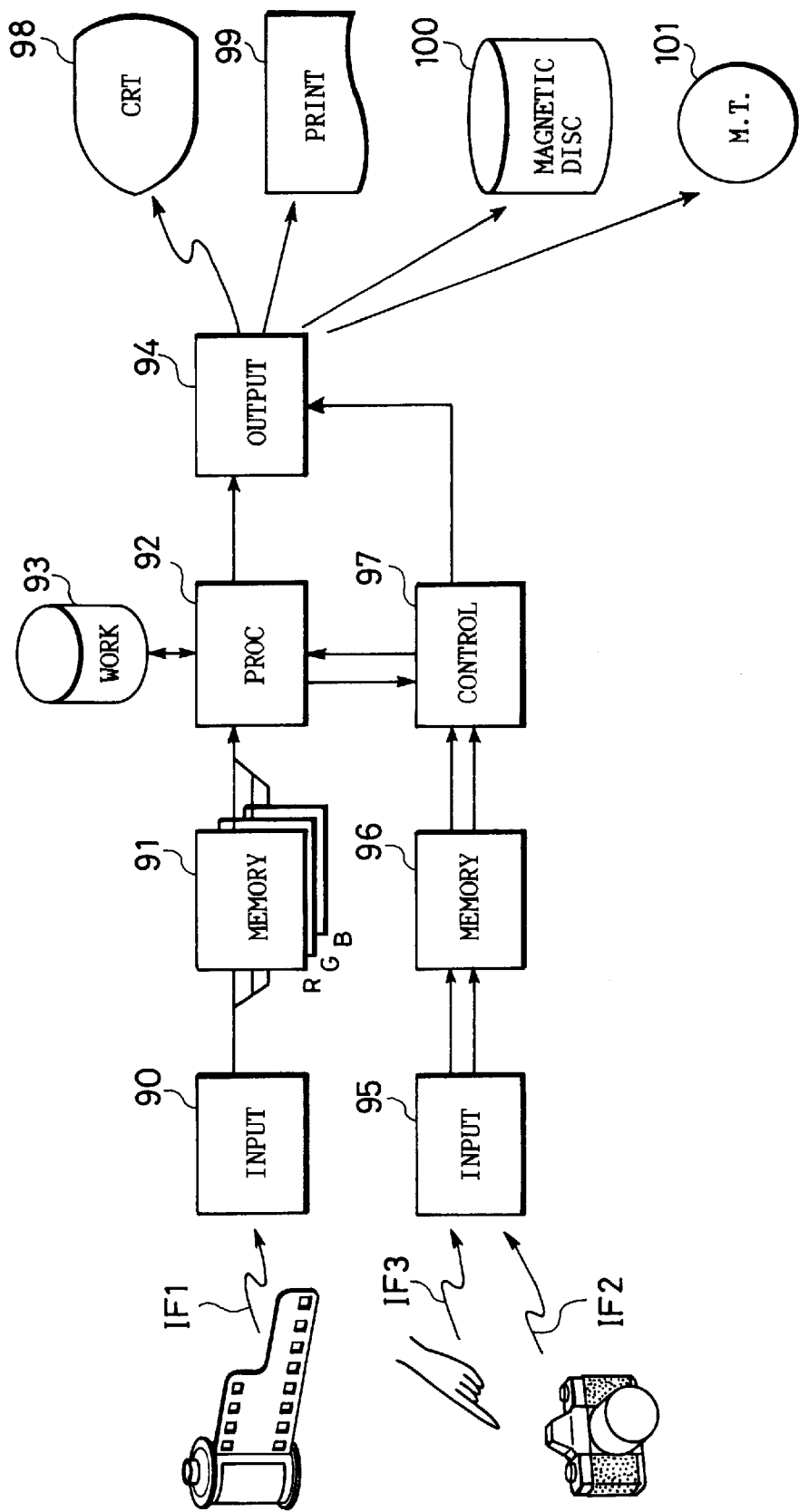
FIG. 1 is a block diagram illustrating the image processing system according to an embodiment of the present invention.

The block diagram showing the entire system of the embodiment is shown in FIG. 1. In the figure, IF1 represents still image information which is to be obtained from a source such as a silver salt film, magnetic tape and magnetic disc. IF2 represents the photographing condition information, and IF3 represents the conversion process condition information.

An input unit 90 converts input signals to electric signals. If the still image information IF1 source is a magnetic medium, the input unit 90 is constructed of a magnetic head, head amplifier, A/D converter and so on. If the information IF2 source is a film, the input 90 is constructed of a so-called telecine camera, A/D converter and so on. From the input unit 90, the image information is outputted as digital signals. Reference numeral 91 represents digital image memories for three primary colors R, G and B. An image processor 92 performs a conversion process, reading necessary image data of an image from the memory 91 and using a work file 93 as a process memory. After the conversion process is completed, an output unit 94 outputs the processed image data in the form suitable for output devices, which may be a CRT display 98, print medium 99, magnetic disc 100, magnetic tape 101 or the like as shown in FIG. 1. The image processor 92 is controlled by the outputs from a controller 97.

Figure 8:
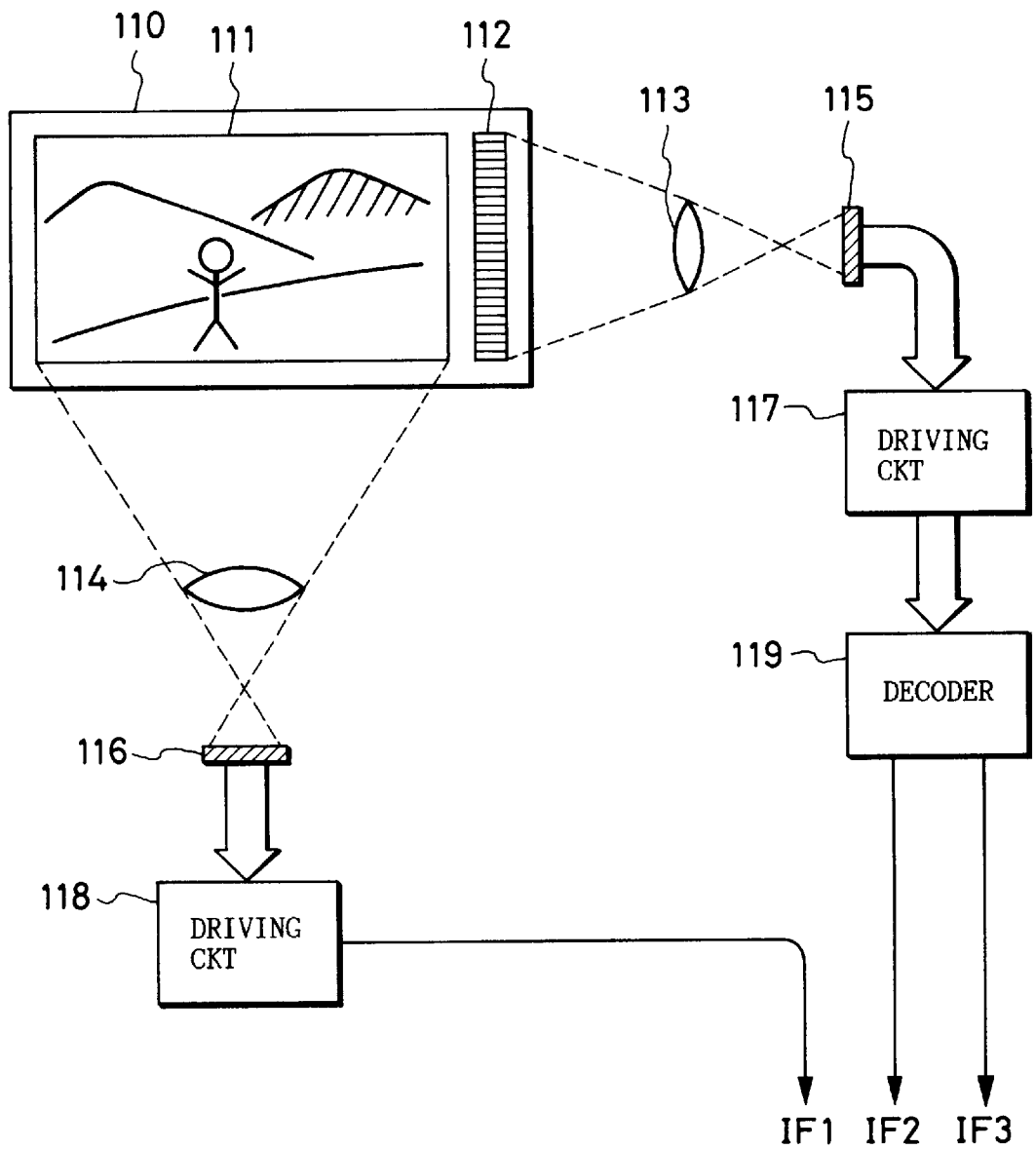
FIG. 8 schematically shows the information input unit.

The control sequence as to how an image is processed under the image processor 92 using the information IF2 and IF3, will be described. FIG. 8 is the conceptional view showing the recorded information IF1, IF2 and IF3 and its reproducing method.

When a still image 111 is photographed on a film 110, the condition information signals of binarized code are recorded at that time at the side 112 of the film. The recorded information IF1 to IF3 is reproduced by a reproducing unit including elements 113 to 119.

The optical system (lenses) 113, 114 focus the information onto the corresponding sensors 115, 116 whose outputs are supplied to the corresponding driving circuits 117, 118. The output of the driving circuit 117 is supplied to the decoder 119 which separates the information IF2 and IF3.

The reproduced information IF1 is processed, as previously discussed, by the A/D converter section and R, G, B separating section of the input unit 90 and transferred to the memory 91.

An input unit for the information IF2, IF3 corresponds to those elements 113, 115, 117 and 119 of FIG. 8. The reproduced information IF2, IF3 are temporarily stored in another memory 96 to set up control parameters and supplied to the controller 97 which outputs proper control parameters to the processor 92.

As above, the conversion process by the processor 92 can be performed only with those control parameters set by the photographer at the time of photographing. However, if desired, the control parameters for the conversion process conditions may be added or changed by means of a keyboard for example.

Embodiment Regarding Cross Screen Filter Effect

An example of a special effect process using the photographing condition information IF2 and the conversion process condition information IF3 will be described in connection with the cross screen filter effect described above.

The length L of a bright beam (cross beam) generated using a conventional optical filter, e.g., a cross screen filter, is determined from the maximum diffraction angle $\theta$ of incident light to the filter and the focal distance f of the lens:

$$L = f \cdot \tan \theta$$

The focal distance f of the lens is used as the photographing condition. As the conversion process conditions, an information flag indicative of the use of a cross screen filter, the number of beam, the number of spots to be processed, and the like are used.

Figure 9:
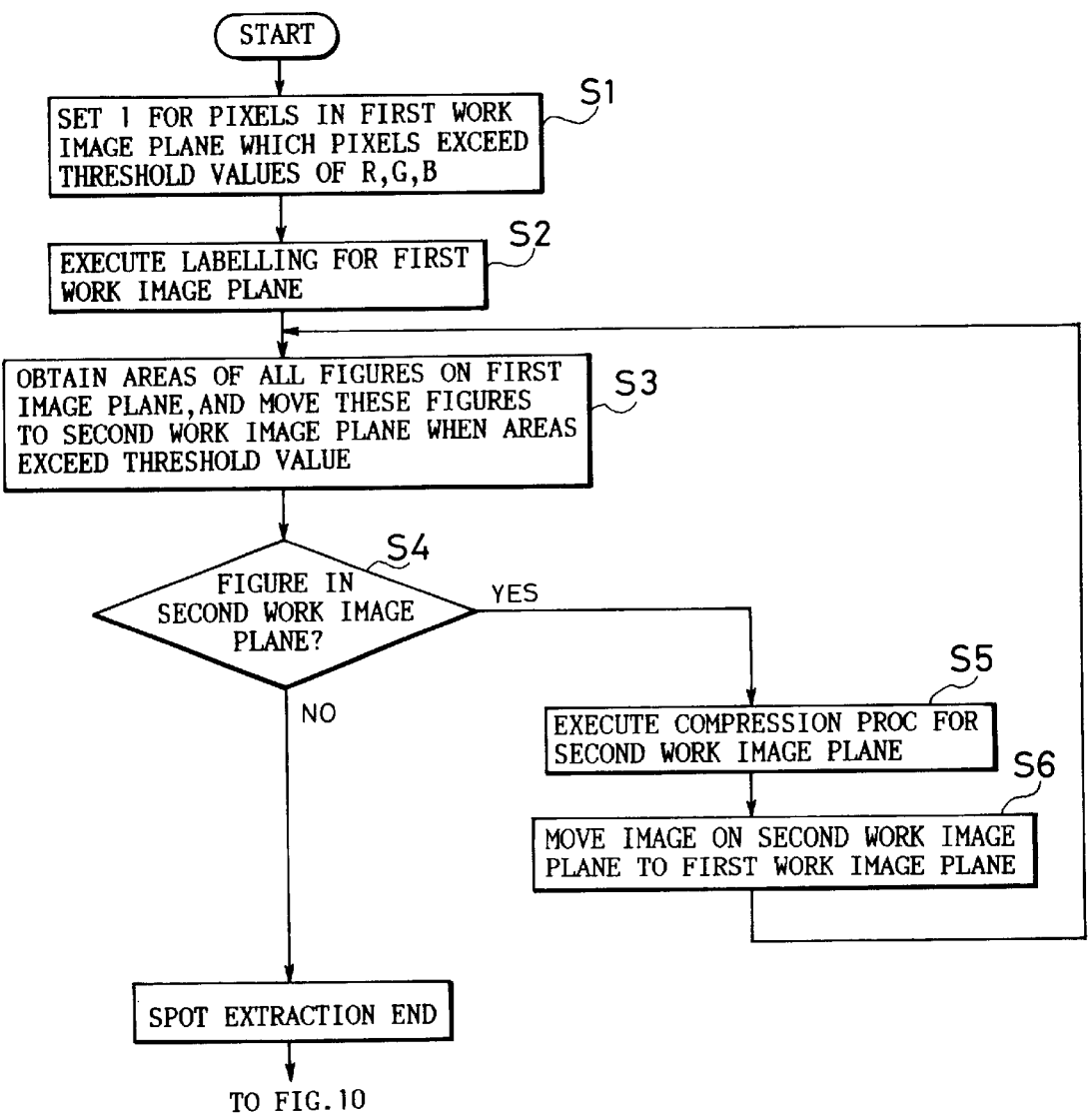
FIGS. 9 to 11 are flow charts illustrating the cross screen process.
Figure 10:
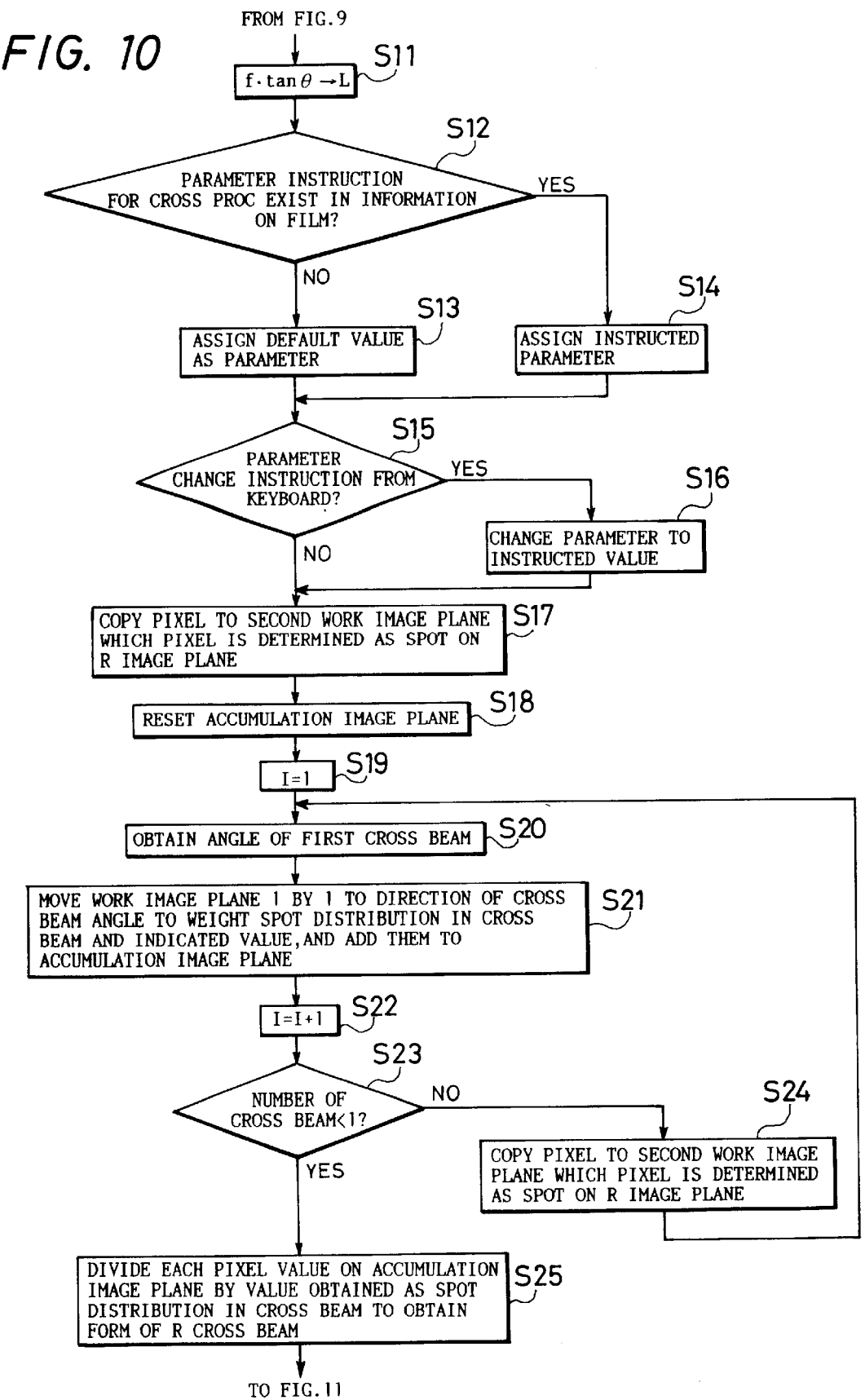
Figure 11:
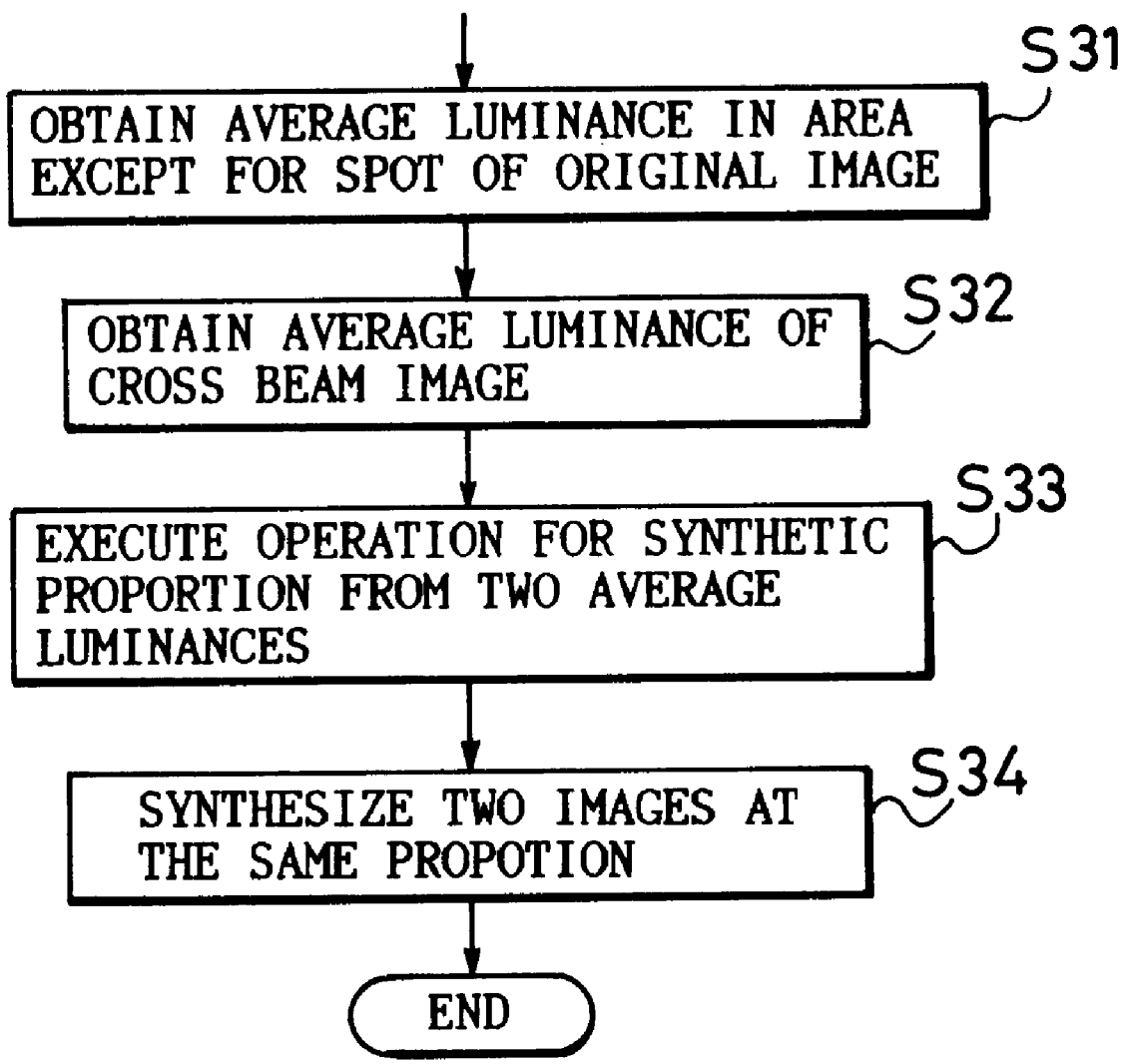

The operation of the processor 92 will be described with reference to the control flow chart of FIGS. 9 to 11.

First, all pixels of a still image inputted are checked to determine if they exceed their respective R, G and threshold values. A value 1 is in a first work image plane of the work file 93 for the pixels exceeding the threshold value and a value 0 is set for the other pixels. In this embodiment, all the pixels are independently checked to see if they exceed the threshold values. However, the gradation of R, G and B pixels may be added together at a certain addition proportion and the added result compared with another threshold value, to thereby enable simplified calculation. To further simplify the calculation, it is possible to use the gradation of only G pixels for comparison with another threshold value. (Step S1)

In most cases, a pixel having the value 1 in the first work image plane can be considered as a spot. However, in the case of photographing a scene having a very bright light source, the light quantity becomes saturated on the film so that the adjacent portion of the spot becomes light. As a result, the spot becomes unnecessarily large which leads to broad cross beams after the cross process. Thus, it is necessary to make too large a spot smaller.

To this end, the binarized first work image plane is subject to a labelling process for numbering all figures (collection of consecutive pixels having a value 1) (Step S2). Next, the areas of all the figures are obtained and those figures whose areas exceed a threshold value are moved from the first work image plane to a second work image plane of the work file 93 (Step S3). Then, the second work image plane is subjected to a compression process to remove the pixels of value 1 at the periphery of figures (Step S5). The compressed image on the second work image plane is moved to the first work image plane (Step S6) to again obtain the areas of all the figures. This routine is repeated until all the areas become smaller than the threshold value (Step S4). Consequently, too large a spot becomes small so that the problem of broad cross beams after the cross process can be solved. Although the dimension of a spot is determined based on the area thereof in the above embodiment, the maximum dimension of a figure may also be used for determination of the spot dimension.

Further, in the above embodiment, since all R, G and B pixels are checked to see if they exceed the threshold values, only those spots near white are extracted. However, spots may be extracted by independently checking to see if respective R, G and B pixels exceed the corresponding threshold values. In this case, the cross effect of spots near a monochromatic color is possible after the following R, G and B cross effect process.

The extraction of spots is completed in the above processes.

It becomes necessary for preparing parameters, i.e., the number of cross beams, phase, length and luminance distribution (luminance ratio for each distance 1), to execute cross effect calculation. The parameter for the length L is determined by the calculation f×tan θ (Step S11). If parameter instruction other than the length L exists in the information recorded on the film, the instructed parameters are used. If not, predetermined values (default values) are assigned as parameters (Steps S12 to S14). If parameter change instruction is inputted from a keyboard or the like, the inputted parameter is substituted for the old one (Steps S15, S16).

Next, of the pixels on the R image, only a pixel determined as a spot is copied to the second work image plane (in the following specification, work image plane means the second work image plane unless otherwise specified) (Step S17). Next, an accumulation image plane is prepared for accumulation in the cross process. (Step S18) The accumulation image plane is required to have a capacity sufficient for preventing an overflow during accumulation. All pixels of the accumulation image plane are initially reset at 0, and I indicative of the number of processed beams is set at 1 (Step S19).

Next, the angle of a first cross beam instructed by the phase parameter is obtained (Step S20) to move the work image plane by a distance 1. In this case, the pixel of the moved work image plane may not precisely correspond to the the pixel position since the pixel is represented by binarized code. Therefore, the work image plane is moved to the nearest corresponding pixel position. Alternatively, the corresponding pixel position may be determined by means of interpolation calculation or the like, based on the distance from the original pixel position. Pixels which are moved outside of the work image plane due to the movement thereof are erased. On the contrary, new pixels which are entered in the work image plane due to the movement thereof are inputted with value 0. Thereafter, the value of each pixel in the work image plane is multiplied by the value indicative of the luminance distribution of the pixel moved by distance 1 in the cross beam. The multiplied result is added to the accumulation image plane. Next, the work image plane is again moved by distance 1. In this case, the value indicative of the luminance distribution of the pixel moved by distance 2 in the cross beam is multiplied by the value of the pixel to add it to the accumulation image plane. The above calculation is repeated until the length L of the cross beam reaches the instructed value (Step S21).

Next, the work image plane in once reset and only the pixel constituting the spot is copied from the R image to the work image plane (Step S24). This work image plane is then moved to the direction of a second cross beam to perform adding the calculated value to the accumulation image plane. The angle of the second cross beam can be obtained by adding the first cross beam angle (instructed as beam phase) and the value of 360 degrees divided by the number of cross beams. The above process is performed for all of the cross beams (Steps S22, S23).

Lastly, each pixel value on the accumulation image plane is divided by the sum of the values derived as the luminance distribution in the cross beam, to thereby decide the shape of the cross beams in the R image (Step S25). By executing the processes at steps S17 to S25 for the G and B images, the shape of the cross beams in the R, G and B images can be obtained.

In the above explanation of the cross process, the same calculation is effected for all the R, G and B images. However, other simplified calculation may be used. For instance, such calculation is made based on an image obtained by adding the R, G and B images at a certain addition proportion, and the calculation result is used for the shape of cross beams of all the R,G and B images. Or such calculation is made based on only the G image and the calculation result is used for the cross beam shape of all the R, G and B images.

With the above cross process, the image of the cross beams alone is formed on the work image plane.

The last process is to synthesize the original image and the cross beam image. To this end, first the average luminance in the area except for the spot of the original image, and the average luminance of the cross beam image, are obtained (Steps S31, S32). A synthetic proportion for the two images is calculated using an empirically obtained formula and the two average luminances (Step S33), then the two images are synthesized at the same synthetic proportion (Step S34). Other simple methods may be employed, such as synthesizing the two images at a predetermined synthetic proportion, simply synthesizing the two images and thereafter removing the overflow pixels, and the like.

Figure 13:
FIGS. 13 and 14 are photographs showing the original still image and the processed image, respectively.
Figure 14:

The image subjected to the cross screen filter process is finally obtained as above. Examples of the original still image and the processed image are shown in FIGS. 13 and 14, respectively.

Embodiment Regarding Background Light Correction

An example of the process for electrically executing a background light correction will be described.

Figure 12:
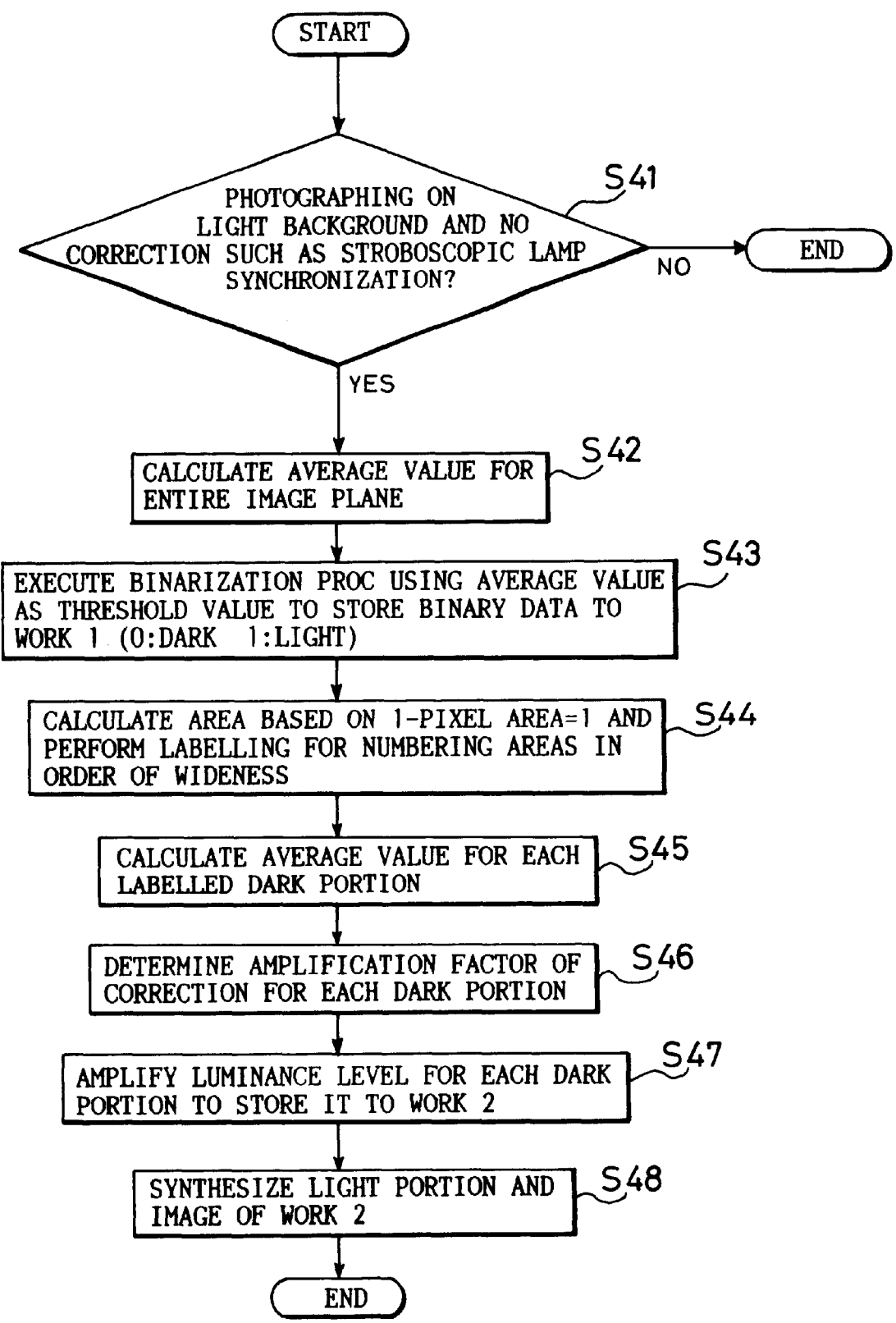
FIG. 12 is a flow chart illustrating the light background correction process.

FIG. 12 is a flow chart illustrating the operation of the processor 92 for controlling the background light correction.

As the photographing condition information IF2, a stroboscopic lamp synchronization flag is used which indicates if auxiliary light was used during photographing. As the conversion condition information IF3, a background light correction flag is used which indicates if the photographer wished to use the background light correction during photographing. The stroboscopic lamp synchronization flag can be set or reset in response to the signal from the camera which detects the actuation of the lamp, while the background light correction flag can be set or reset in response to the depression of a background light correction button which is normally provided for the conventional silver salt camera.

First, at step S41, it is checked if the background light correction flag is set and the stroboscopic lamp synchronization flag is reset. If affirmative, it follows the processes starting from step S42 for performing the background light correction.

At step S42, an average luminance level of an original image in the memory 91 is calculated. Using this average level as a threshold value, a binarization process is executed to divide the image into dark portions and light portions, respectively assigned values 0 and 1, and they are stored in the first work image plane (Step S43).

Since a plurality of dark portions may exist in the image, the area of each dark portion is calculated, and the calculated areas are labelled for numbering the areas in order of wideness at step S44 (Labelling).

At step S45, the average value for each labelled dark portion is calculated. Then, the amplification factor k of correction for each dark portion is determined at step S46. The amplification factor k is determined from Ya/Yd or Yt/Yd, where Yd is the average luminance of the dark portion, Ya is the average luminance of all pixels, and Yt is the most appropriate average luminance. The luminance level for each dark portion is amplified by the amplification factor k to store it to the second work image plane (Step S47). Lastly, the light portions and the dark portions of the second work image area are synthesized to obtain a finished image.

As above, it is possible to increase the dark portion luminance in accordance with an average luminance of the dark portions. Since the dark portions are not amplified at a constant amplification factor over the entire dark portions, it is possible to avoid white blanks in the dark portions, thereby enabling a natural background light correction.

Although the present invention has been described in connection with the examples of the cross screen filter effect and the background light correction, other special effect process may also be applied to the present invention, such as consecutive photographing, zooming during exposure, timing and the like.

As seen from the foregoing description of the present invention, even if the conversion process is performed after photographing, the intent of the photographer can fully be reflected. In addition, since the photographing conditions can be reflected in the conversion process, the length of cross beams and other factors can be realized in the same manner as with an optical filter.

The present invention is not limited to the above embodiments, but various applications and alterations are possible within the scope of the following claims.

What is claimed is:

1. A signal processing apparatus comprising:

image pickup means for picking up an object image and for producing an original image signal;

bright line forming means for extracting a bright signal of a bright portion of the original image signal obtained by said image pickup means, and for forming a bright line having a predetermined length by performing a shifting of the bright signal in a predetermined direction; and synthesizing means for synthesizing the bright line formed by said bright line forming means with the original image signal.

2. An apparatus according to claim 1, wherein said bright line forming means comprises detecting means for detecting the bright signal of the bright portion of the original image signal.

3. An apparatus according to claim 1, further comprising recording means.

4. An apparatus according to claim 2, wherein said recording means records the original image signal obtained by said image pickup means and a control signal indicating to execute a cross screen filter process.

5. An apparatus according to claim 4, further comprising reproducing means for reproducing the signal recorded by said recording means.

6. An apparatus according to claim 5, wherein said reproducing means executes the cross screen filter process by reproducing the the original image signal and the control signal.

7. An image signal processing apparatus comprising:

extracting means for extracting a bright portion of an image signal;

shifting means for shifting said bright portion in a predetermined direction to form a bright line signal; and synthesizing means for synthesizing said bright line signal with said image signal.

8. An apparatus according to claim 7, further comprising an image pickup means for generating the image signal.

9. An apparatus according to claim 7, wherein said shifting means forms a plurality of bright lines in different directions.

10. An image processing method comprising:

an extracting step for extracting a bright portion of an image signal;

a shifting step for shifting the bright portion in a predetermined direction to form a bright line signal; and a synthesizing step for synthesizing the bright line signal with the image signal.

11. A method according to claim 10, further comprising an image pickup step for generating the image signal.

12. A method according to claim 10, wherein said shifting step forms a plurality of bright lines in different directions.

* * * * *

UNITED STATES PATENT AND TRADEMARK OFFICE
CERTIFICATE OF CORRECTION

PATENT NO. : 6,343,137 B1
DATED : January 29, 2002
INVENTOR(S) : Hiroyuki Kimura et al.

It is certified that error appears in the above-identified patent and that said Letters Patent is hereby corrected as shown below:

Column 2,
Line 20, "OR" should read -- OF --.

Column 4,
Line 12, "beam," should read -- beams, --.

Column 5,
Line 15, "process. (Step S18)" should read -- process (Step S18). --;
Line 25, "the" (second occurrence) should be deleted;
Line 31, "of" should be deleted;
Line 45, "in once reset" should read -- is reset once --; and
Line 64, "calculation" should read -- calculations --.

Column 7,
Line 10, "process" should read -- processes --.

Column 8,
Line 12, "the" (second occurrence) should be deleted.

Signed and Sealed this

Twenty-second Day of April, 2003

JAMES E. ROGAN
*Director of the United States Patent and Trademark Office*